D. L. ADELSPERGER.
METHOD OF AND APPARATUS FOR TREATING COTTON SEED.
APPLICATION FILED DEC. 24, 1917.

1,349,034.

Patented Aug. 10, 1920.
4 SHEETS—SHEET 1.

WITNESSES:
R W Hoagland

INVENTOR
Don L. Adelsperger
BY
Staley & Bowman
ATTORNEYS

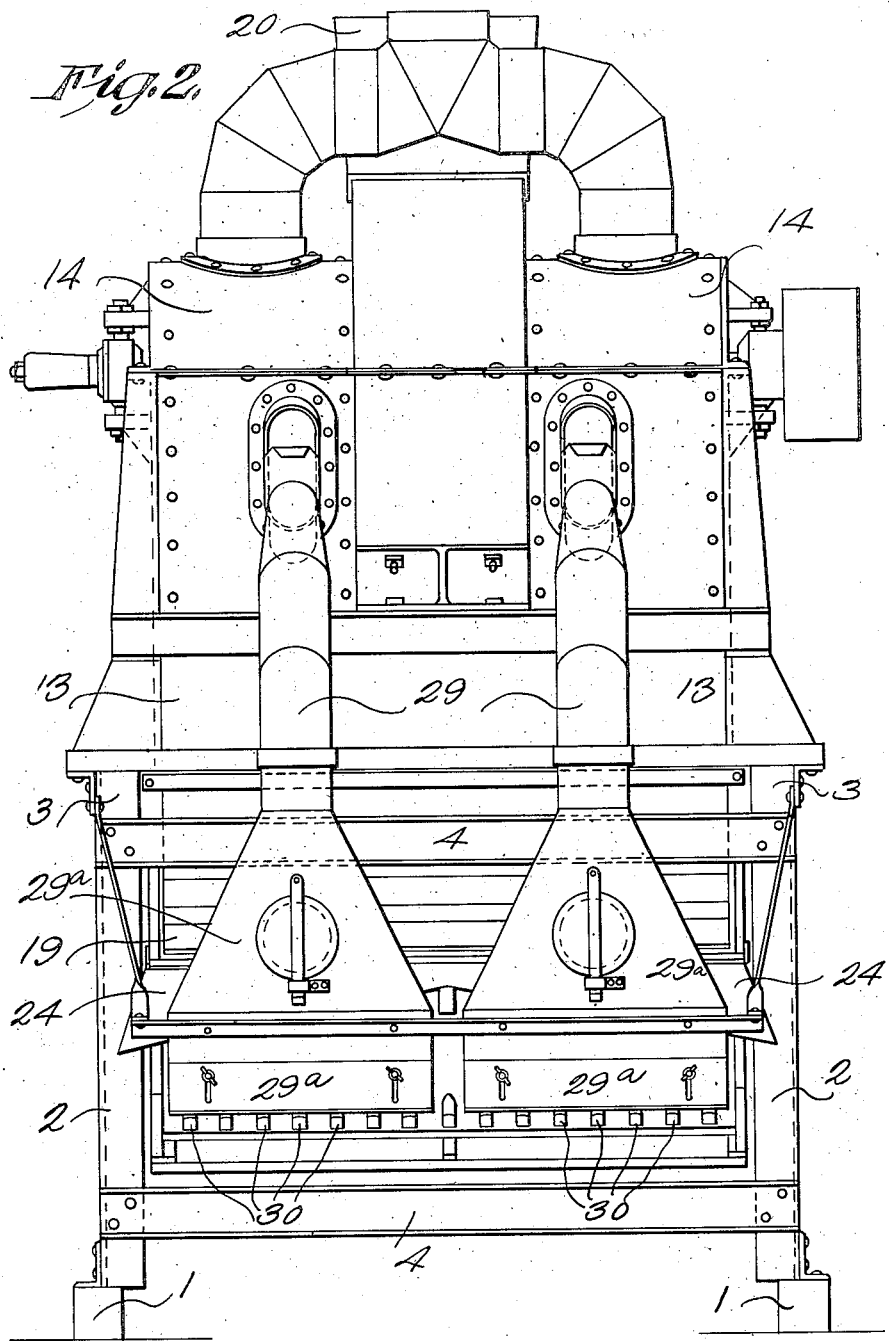

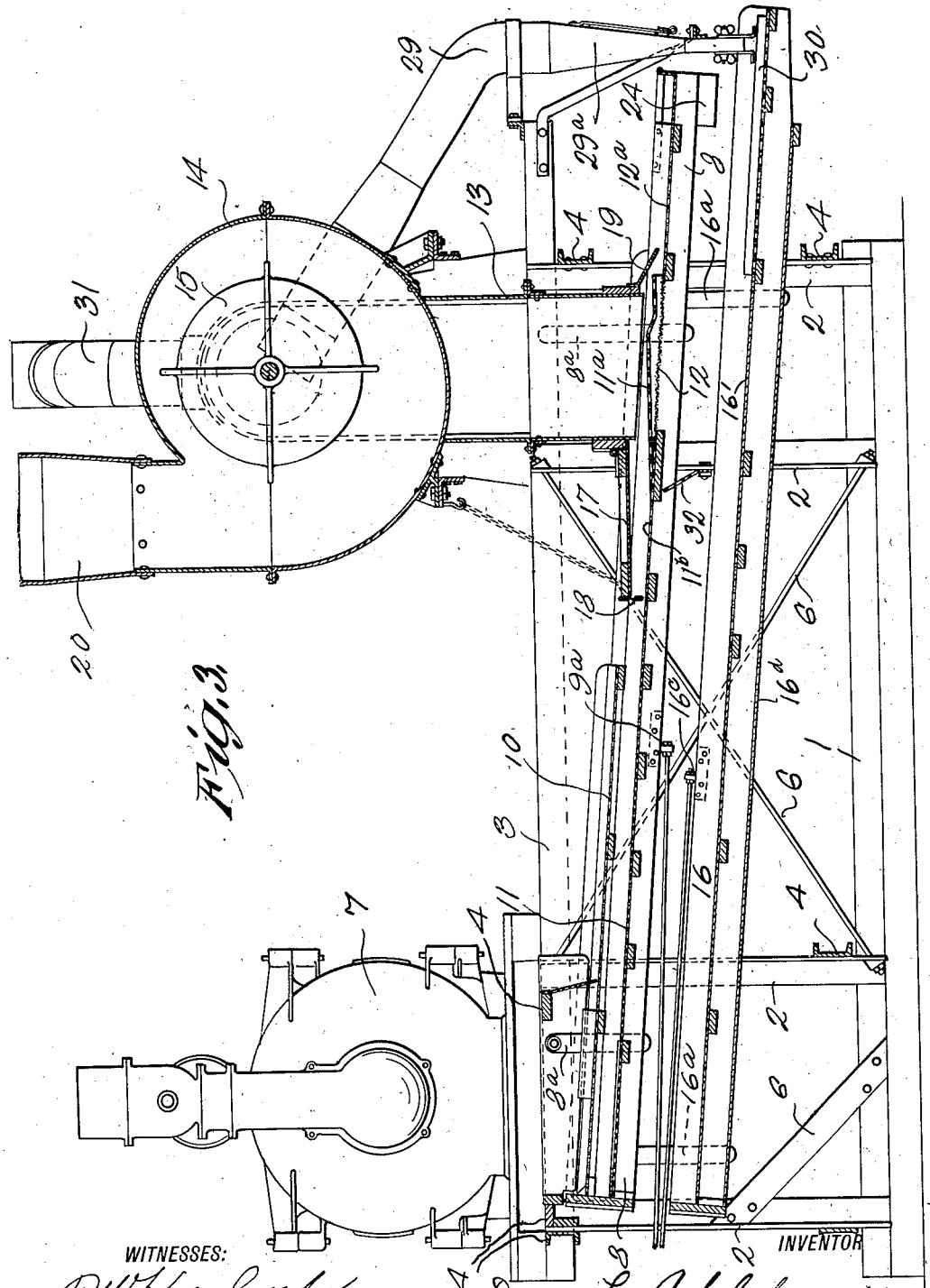

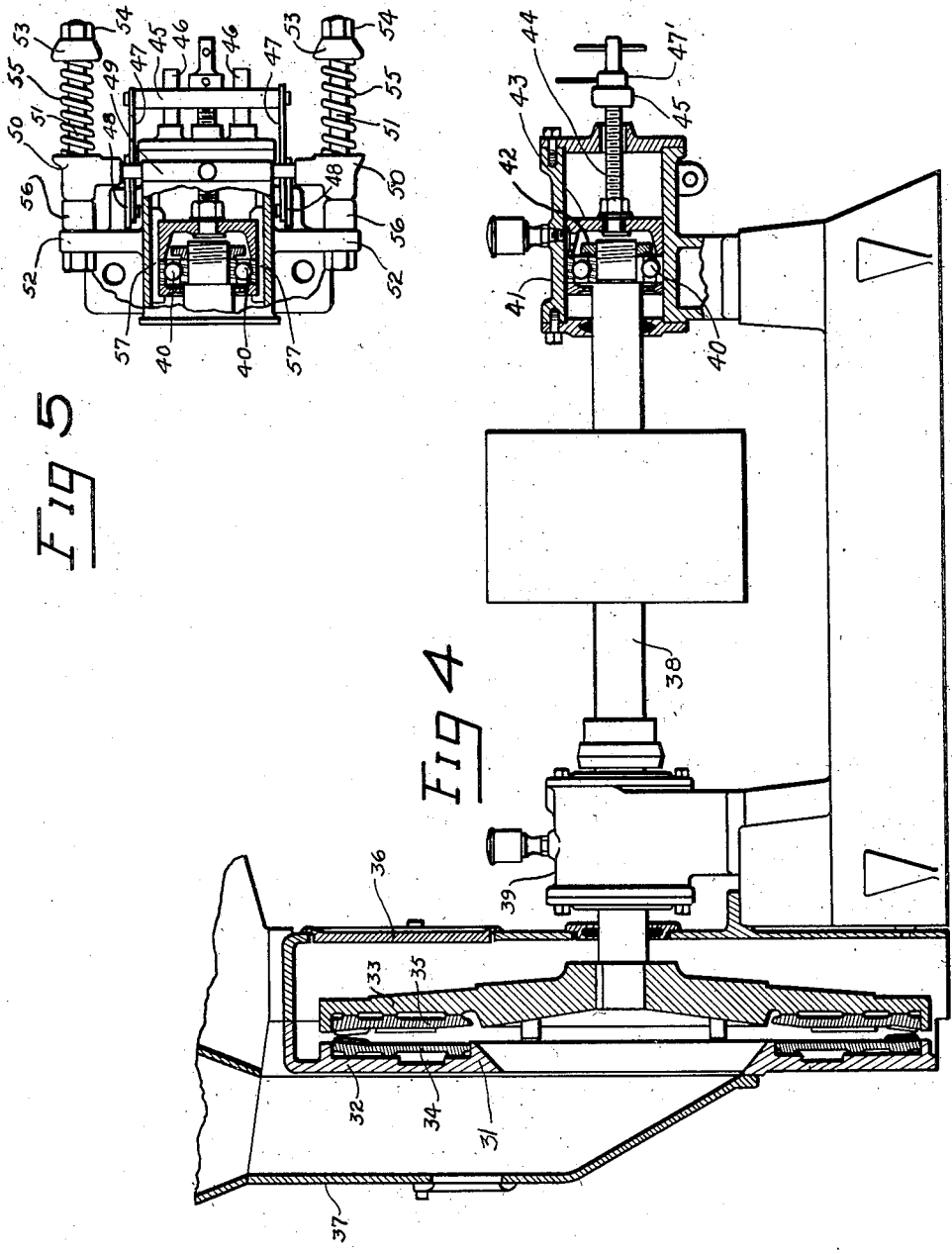

UNITED STATES PATENT OFFICE.

DOW L. ADELSPERGER, OF SPRINGFIELD, OHIO, ASSIGNOR TO THE BAUER BROTHERS COMPANY, OF SPRINGFIELD, OHIO, A CORPORATION OF OHIO.

METHOD OF AND APPARATUS FOR TREATING COTTON-SEED.

1,349,034.   Specification of Letters Patent.   Patented Aug. 10, 1920.

Application filed December 24, 1917.   Serial No. 208,613.

*To all whom it may concern:*

Be it known that I, DOW L. ADELSPERGER, a citizen of the United States, residing at Springfield, in the county of Clark and State of Ohio, have invented certain new and useful Improvements in Methods of and Apparatus for Treating Cotton-Seed, of which the following is a specification.

My invention relates to an improved method of and apparatus for treating cotton seed to separate the meats from the hulls and lint. Heretofore, a plurality of units have been employed, each unit having hulling, shaking and beating devices, the seed and its product being treated in like manner through each unit. It has been found that when treating closely linted seed by this method it is difficult to remove the lint and sufficient hulls from the meats. An excess of black hulls passing with the meats lowers the protein contents of the meats, decreases the press room capacity, and makes it impossible to produce a high grade cotton seed meal.

To overcome this difficulty, I have devised an improved method, and apparatus simplified and reduced to a single unit, in which I employ only one huller with a shaker and beater. The huller is set to cut a major portion of the flow of seed to it and means are provided to return from the shaker the uncut seed to the original flow for a second passage through the huller. Any seed that escapes hulling during the first passage through the machine is usually caught on the second and so it is not attempted to hull all the flow at one passage. This makes it possible to set the cutting surfaces of the huller farther apart, allowing the meats to pass through in larger pieces and hence facilitating separation.

A double shaker is provided and means are employed to pneumatically lift the hulls from each shaker and direct the same for treatment by the beater, said means being so arranged as to return the tailings from the beater to the flow for retreatment by a beater.

My invention will now be more particularly described and pointed out in the claims. In the accompanying drawings:

Fig. 2 is a view of the opposite end of the machine from that shown in Fig. 1.

Fig. 3 is a longitudinal section of a portion of the machine.

Fig. 4 is a longitudinal section of the huller.

Fig. 5 is a transverse section of a portion of the same.

Figure 1:
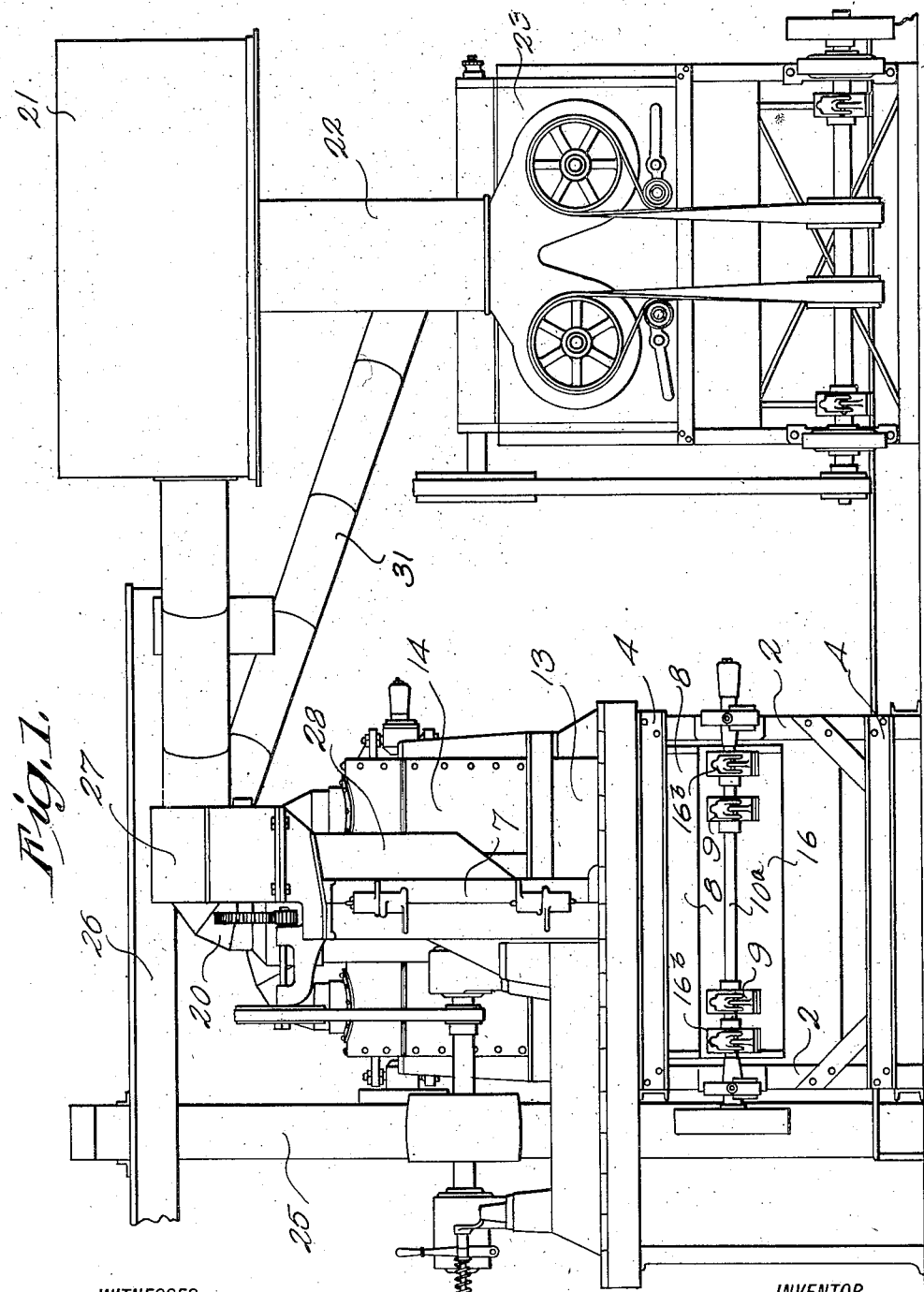
Figure 1 is an end view.

The main supporting frame consists of longitudinally extending bases 1, upright standards 2, upper longitudinally extending beams 3, transversely extending connecting pieces 4 and brace rods 6. There is provided a huller 7 of well known form, mounted upon the main frame at one end thereof, for the purpose of cutting or hulling the seeds. The hulled seeds, as well as the whole ones, fall upon the upper inclined shaker, the general construction of which is the same as heretofore employed, but which possesses some novel features hereinafter to be described. The frame of this shaker is represented by 8, and it is hung on pivoted arms $8^a$ and connections $9^a$ from the eccentrics 9 on the shaft $10^a$ furnish the means for vibrating or oscillating the shaker in a well known way.

The seed to be worked is delivered to the huller 7, and here the major portion is cut or hulled and the entire product falls upon the screen 10; gradually falling through the openings of screen 10 to screen 11; it moves on toward the discharge end of the shaker, passing first under the adjustable cover 17, from which is suspended a curtain 18, and then under the suction chamber 13. This suction chamber leads to the fan casing 14, which is provided with a suitable fan 15. Instead of discharging the product of the huller directly upon the screen 11, the screen 10 is interposed to give a better distribution of the product for the action of screen 11.

That part of the shaker screen 11 which lies under the suction chamber 13, is raised slightly or formed straight in a horizontal direction as indicated at $11^a$. Beneath the portion $11^a$ is a third screen 12, and another screen $12^x$ in alinement with it which leads to the lower end of the shaker. The openings of the screen portion $11^a$ are sufficiently large to allow all the meats and whole seed to fall therethrough. The hulls would also fall through but for the air suction which lifts them up through the chamber 13, and fan casing 14, whence they are delivered by way of the cyclone 21 of common form and the chute 22 to the beater 23.

In order to insure the air entering the suction chamber 13 to take its proper course through the screens 12 and 11ª, the following measures are taken: The perforations in the screen of the lower shaker are discontinued at a point just beneath the screens 11ª and 12, as indicated at 16'. An inclined lip 19 shuts off any unnecessary opening at the point where the seed pass out from under the suction, and at the point where the material enters the suction, the previously mentioned cover 17 and curtain 18 are provided. Cover 17 is hinged at one side and can be adjusted up and down at the free side so as to bring the flexible curtain 18 in close proximity to the screen. By means of this construction, a slight vacuum is produced under the cover 17 which is relieved by the air coming in through the portion 11ᵇ of the screen 11. This makes it possible to have the holes in 11ᵇ comparatively large, yet small particles of hull cannot fall through because of the upward current of air. By raising or lowering the cover 17 and the curtain 18, more or less hulls as desired will pass through the screen 11ᵇ with the meats. The deflector 32 reaches across the machine under screen 11ᵇ to prevent the suction up through the screen from interfering with this action.

The whole seed, after passing through screen 11ª to screen 12, which is not coarse enough for them to go through, pass on over screen 12ª to the end of the shaker, where they fall into the spout 24 and are then conveyed back into the main flow of seed to the huller by an elevator 25 and carrier 26 into the spout 27 which communicates with the huller.

The meats fall through screens 12 and 12ª on to the lower shaker 16 of a well known construction. It is hung on pivoted hangers 16ª and vibrated from the eccentrics 16ᵇ by connections 16ᶜ, similar to the connections on the upper shaker. The finer meats in their travel down the upper shaker sift through the screen 11, the perforations of which gradually increase in size, and dropping down upon the lower shaker eventually mingle with the meats from screens 12 and 12ª.

The screen on the lower shaker is quite fine, only being intended to separate out the small dusty particles of meats which might be drawn up by the suction if allowed to continue to the end of the shaker. These small particles fall on the solid bottom 16ᵈ, and are carried to the end of the shaker where they are discharged with the finished meats.

The larger meats continue down the shaker, and, after entering the channels created by the slats 30, and passing under the suction boots 29ª, they are discharged at the end of the shaker, finished. Any lint or light hull that may have found its way into the meats is drawn off by the suction by way of the conduit 29 to the suction chamber 13, and follows the same route as the other hulls therein to the beater 23. The purpose of the beater 23, which is of well known form, is to agitate the hulls and beat loose any fine floury meats which may be clinging to them. In order to have the meats reclaimed by this machine in as clean a condition as possible, a suction boot, not shown, but similar to 29ª is provided, to draw off any lint or fine hull from the meats discharging from the end of the beater shaker. Particles drawn up are carried back to the suction chamber 13 by way of the conduit 31, and then returned to the beater with the fresh flow of hulls for rebeating and separation of any remaining portions of the meats adhering to the hulls.

As before stated, the huller employed is of a type well known, as shown, for instance in Patent No. 1,310,031, dated July 15th, 1919, but may be briefly described as follows, referring more particularly to Figs. 4 and 5: 31 represents a stationary grinding head and 33 a revoluble grinding head, carrying grinding disks 34 and 35, mounted in a suitable casing 36, having a hopper 37 which conveys the material to the center of the stationary disk in the usual way. The revoluble head is secured to the driving shaft 38 which is mounted in bearings in the box 39 at its forward end and also in bearings 40 in a box 41 at its rear end; the bearings 40 being clamped between the shoulder formed by the reduced rear end of the shaft and a nut 42 threaded thereon. A head 43 is slidably mounted in the box 41 and has swivelly connected therewith a screw 44 which projects through the rear end of the box and is threaded in a cross bar 45 which bar is slidably mounted upon the pins 46 projecting from the end of the box. A nut 47' threaded on the screw is employed to hold the screw in its adjusted position with respect to the cross bar after the proper adjustment of the grinding disks have been made and each end of the cross bar has pivoted thereto a link 47, the forward ends of the links being in turn pivotally connected to arms 48 of a bifurcated lever 49, the respective parts of which are pivotally connected with sleeves 50 slidably mounted on rods 51 which are clamped to laterally extending lugs 52 projecting from the sides of the box 41. Between the sleeves 50 and collars 53, held in position by nuts 54, are coil springs 55. These springs serve to hold the grinding disks in grinding relation with each other. When the parts are in the position shown in Fig. 5, it will be seen that the links 47 and arms 48 are in longitudinal alinement with each other so that the springs will tend to hold the cross bar 45 toward the center of the machine, the movement being limited by the contact of the sleeves 50 with the ears 52 or rather with the interposed collars 56. By this means the grinding disk may be so set as to break the seeds in the manner before explained. In the event of the entrance into the huller of any foreign substance liable to injure the parts, the disks are allowed to separate against the tension of the springs, and if desired a quick release may be accomplished by throwing bifurcated lever away from the center of the machine, so as to cause the arms 48 to push the links 47 and hence the cross bar 45, screw 44 and block 43 away from the center of the machine; the block 43 being connected with the cage of the bearings 40 by gibs 57 so as to likewise withdraw the driving shaft and the revoluble grinding disk 33.

By the construction described it has been found that a better separation of meats and hulls can be had than with prior machines, and further, by reason of the arrangement, whereby the unhulled seeds can be separated from the hulls and meats, I am enabled to hull or cut the seeds much coarser than heretofore, which not only assists in the separating process, but also retains the meats in a coarser state than heretofore. It should, perhaps, be explained that it is quite possible to cut or crush practically all of the seed upon the first operation if the cutting surfaces of the huller are set close together, but if the surfaces are set for coarse hulling, some of the seeds necessarily pass through the huller in an unbroken condition.

Having thus described my invention, I claim:

1. A process of treating cotton seed, consisting of cutting the major portion of a flow of seed by spacing apart the cutting devices, allowing the cut and uncut portions to flow as one stream for a predetermined distance when the hulls and uncut portions of the seed are separated from the meats and the meats, hulls and uncut seed are directed in separate streams, the uncut seed being returned to the original flow for cutting.

2. A process of treating cotton seed, consisting of cutting the major portion of a flow of seed by spacing apart the cutting devices, allowing the cut seed and the whole seed to flow together to a predetermined point when the hulls of the cut seed are pneumatically lifted while the meats and whole seed drop by gravity and are then separated, the whole seed being returned to the original flow for cutting.

3. A process of treating a flow of cotton seed by first cutting a major portion of the seeds in said flow and causing the cut and uncut portions to flow as one stream for a predetermined distance and thereafter directing the combined product out of its normal path of movement whereby the uncut portion may be returned to the original flow of seed and the cut portion be separated, the meats from the hulls, for the purpose specified.

4. A process of treating a flow of cotton seed by first cutting a major portion of the seed and causing the cut and uncut portions to continue to flow a predetermined distance and thereafter directing the combined product in a manner to retard its flow while causing a separation of the uncut seeds from the product and also separating the hulls from the meat and thereafter returning said uncut seeds to the original flow for the purpose specified.

5. A process of treating a flow of cotton seed by first cutting a major portion of the seed and causing the cut and uncut portions to flow together for a predetermined distance over an inclined surface, and thereupon changing the flow of said product from said incline to a different position and while flowing in said changed position, separating the hulls from said product and also separating the meats from the uncut seed and thereafter returning the uncut seeds to the original flow substantially as specified.

6. A process of treating cotton seed consisting of cutting the major portion of a flow of seed and returning the uncut seed only to the original flow for cutting separating the meats from the products of both cuttings by successive screenings and at each screening pneumatically lifting the hulls, then beating and separating from the flow of hulls any adhering portions of the meats and returning the lighter portions of the hulls to the flow for rebeating and separation of any remaining portions of the meats.

7. The combination with devices for cutting the major portion of a flow of cotton seed, of a shaker with a screen having a section with a mesh suitable to pass the whole seed, means to pneumatically lift the hulls of the cut seed from said section while the whole seed drop by gravity through the mesh of said section, and means to return the whole seed to the original flow for cutting.

8. The combination of devices for cutting the major portion of a flow of cotton seed, of a shaker having a screen to separate the uncut seed, the screen of said shaker having a section provided with a second screen above and projecting at an angle to said screen section, and means to return the uncut seed to said cutting devices.

9. The combination, with devices for cutting the major portion of a flow of cotton seed, of a shaker having a screen to separate the uncut seed, the screen of said shaker having a section provided with a second screen above and projecting at an angle to said screen section, means to return the uncut seed to said cutting devices, and means to pneumatically lift the hulls from said projecting section and direct the same in a separate flow.

10. The combination with devices for cutting the major portion of a flow of cotton seed, of a double shaker having screens to separate the meats and uncut seed, the screen of one of said shakers having a section provided with a second screen above and projecting at an angle to said screen section, means to return the uncut seed to the cutting devices, and means to pneumatically lift the hulls from said projecting section of one of said shakers and the screen of the other shaker and direct the same in a single separate flow.

11. The combination with a huller for cutting cotton seed, a double shaker having screens, and means for returning the uncut seed only to said huller, of a beater, and means to pneumatically lift the hulls from the screen of each of said shakers and conduct the same to the beater, said means being operatively arranged to return the lighter particles of the product to the beater for rebeating.

12. The combination with a huller for cutting cotton seed and a double shaker having screens, one of said shakers underlying and having its discharge end projecting from beneath the discharge end of the other, of a fan having a suction conduit with its mouth spaced above the screen of the upper shaker and a branch conduit with its mouth spaced above the projecting end of the lower shaker, and means to control the movement of the advancing product when it comes under the influence of the draft in said first named conduit.

13. The combination with a huller for cutting cotton seed and a shaker having a screen, of a suction conduit with its mouth spaced above the screen of said shaker, and a leaf extending from said conduit toward the advancing product to control its movement, and means to adjust said control without moving said conduit.

14. The combination, with a shaker having a screen, of a suction conduit, said screen having an overlapping portion placed above at an angle to and forming with the overlapped portion a double screen under the mouth of said conduit, one of said portions being of coarser mesh than the other, and a leaf adjustably attached to said conduit and extending toward the advancing product.

15. The combination with a huller for cutting cotton seed and a double shaker having screens of a fan having a suction conduit with its mouth spaced above one of said shakers and a branch conduit with its mouth spaced above the other shaker, the screen of one of said shakers having overlapping portions forming a multiple screen under the mouth of said first named conduit, a leaf extending from said conduit toward the advancing product and means to adjust said leaf.

In testimony whereof, I have hereunto set my hand this 13th day of December 1917.

DOW L. ADELSPERGER.

Witness:
CHAS. I. WELCH.